United States Patent [19]

Gouda

[11] Patent Number: 4,891,736

[45] Date of Patent: Jan. 2, 1990

[54] SIGNAL HELMET

[76] Inventor: Adam Gouda, 11693 San Vicente, Suite 189, Los Angeles, Calif. 90049

[21] Appl. No.: 152,353

[22] Filed: Feb. 4, 1988

[51] Int. Cl.⁴ ............................................. F26C 15/14
[52] U.S. Cl. ...................................... 362/105; 362/72; 362/332; 362/226
[58] Field of Search ............... 362/72, 105, 106, 103, 362/307, 226, 231, 240, 234, 235, 249, 327, 328, 332, 6, 330, 335, 253, 61; 2/410, 422, 209.1, 209.2; 340/134

[56] References Cited

U.S. PATENT DOCUMENTS

| | | | |
|---|---|---|---|
| 1,244,990 | 10/1917 | Koch | 362/240 |
| 2,473,394 | 6/1949 | Scott | 362/106 |
| 3,577,561 | 5/1971 | Oshima | 2/422 |
| 4,195,328 | 3/1980 | Harris, Jr. | 362/72 |
| 4,231,079 | 10/1980 | Hemnover | 362/106 |
| 4,449,167 | 5/1984 | Cohen | 362/80 |
| 4,545,001 | 10/1985 | English et al. | 362/330 |
| 4,559,516 | 12/1985 | Schott et al. | 340/134 |
| 4,559,586 | 12/1985 | Slarve | 362/72 |
| 4,660,129 | 4/1987 | Manunta | 362/332 |
| 4,760,373 | 7/1988 | Reilly | 362/72 |

FOREIGN PATENT DOCUMENTS

| | | | |
|---|---|---|---|
| 2726322 | 12/1977 | Fed. Rep. of Germany | 362/72 |
| 1401264 | 4/1965 | France | 362/106 |
| 2076276 | 12/1981 | United Kingdom | 2/209.2 |

Primary Examiner—Stephen F. Husar
Assistant Examiner—D. M. Cox
Attorney, Agent, or Firm—Richard C. Litman

[57] ABSTRACT

A signal helmet with a lens whose surface is flush with the surrounding surface in close proximity to the lens. Three signal lights shine through and about the lens for giving tail, brake, and directional indications to following motorists at eye level of the following motorists. The helmet may be equipped with a cable coupled to the motorcycle upon which the wearer rides or the helmet may be telemetered to the motorcycle by a radio module in the helmet.

6 Claims, 2 Drawing Sheets

U.S. Patent    Jan. 2, 1990    Sheet 1 of 2    4,891,736
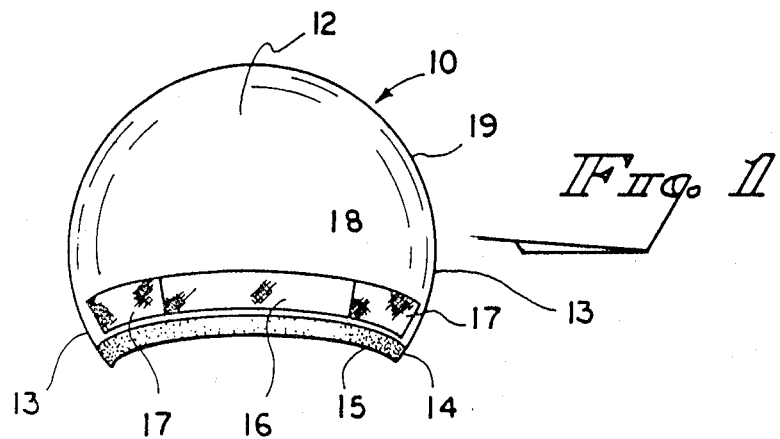
*Fig. 1*
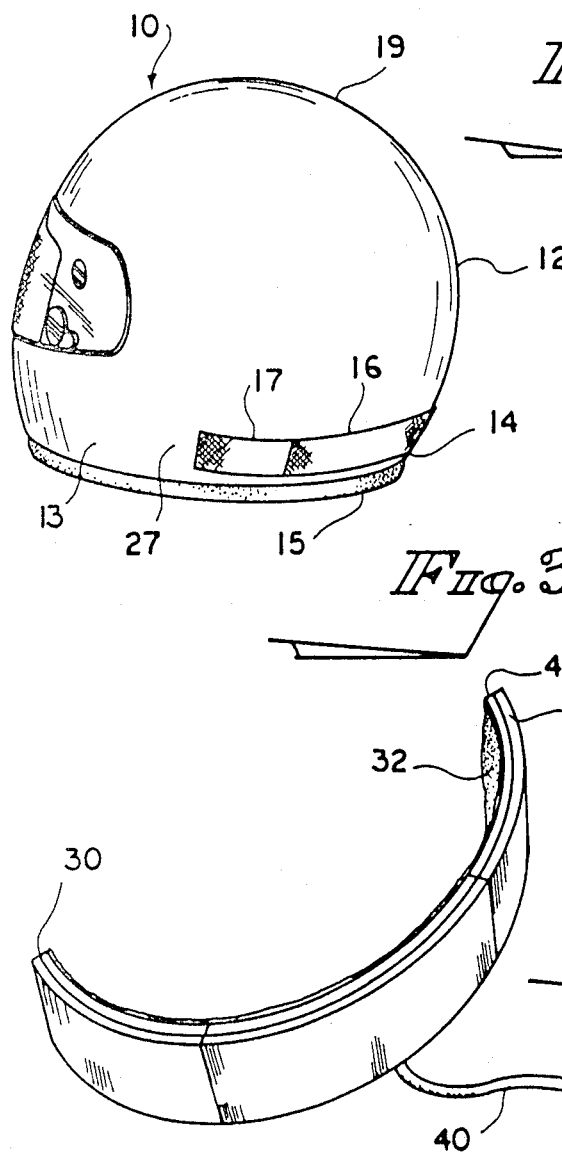
*Fig. 2*
*Fig. 3*
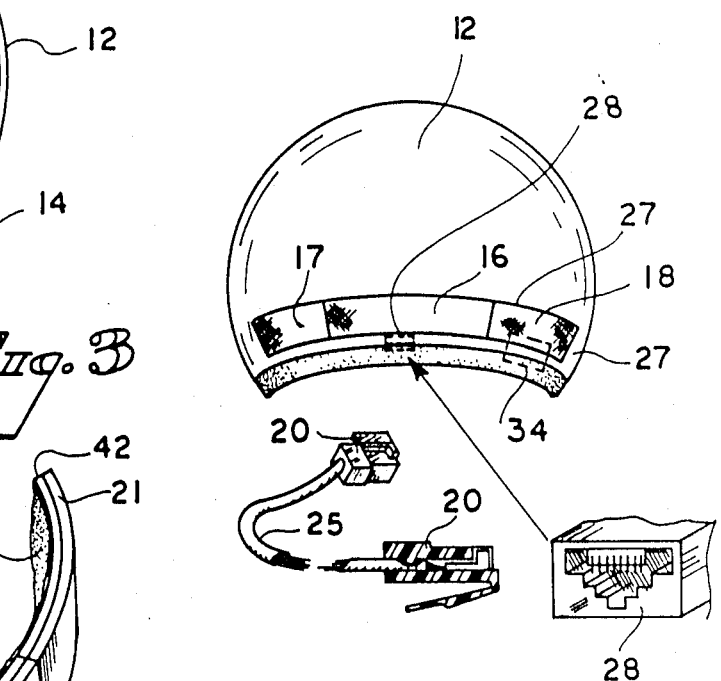
*Fig. 7*

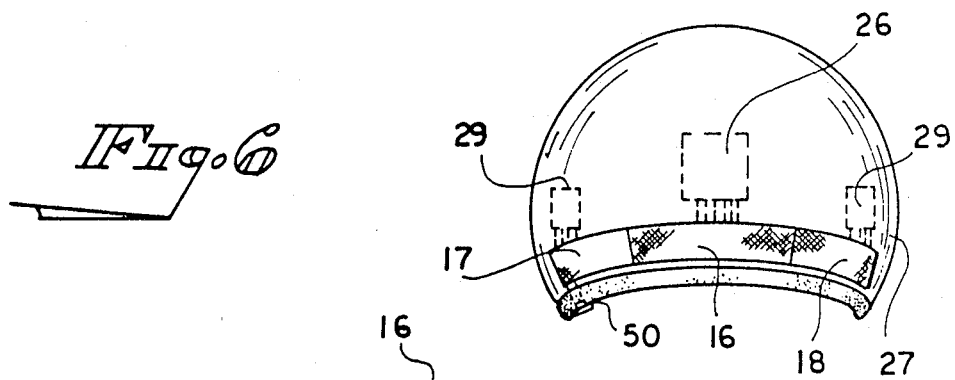
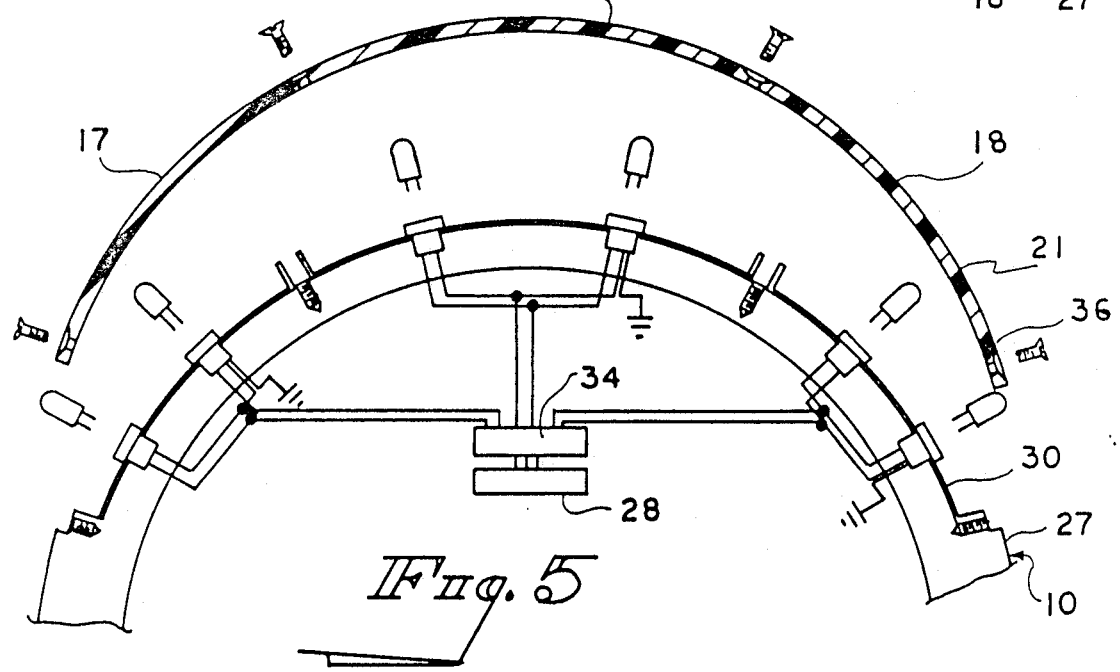
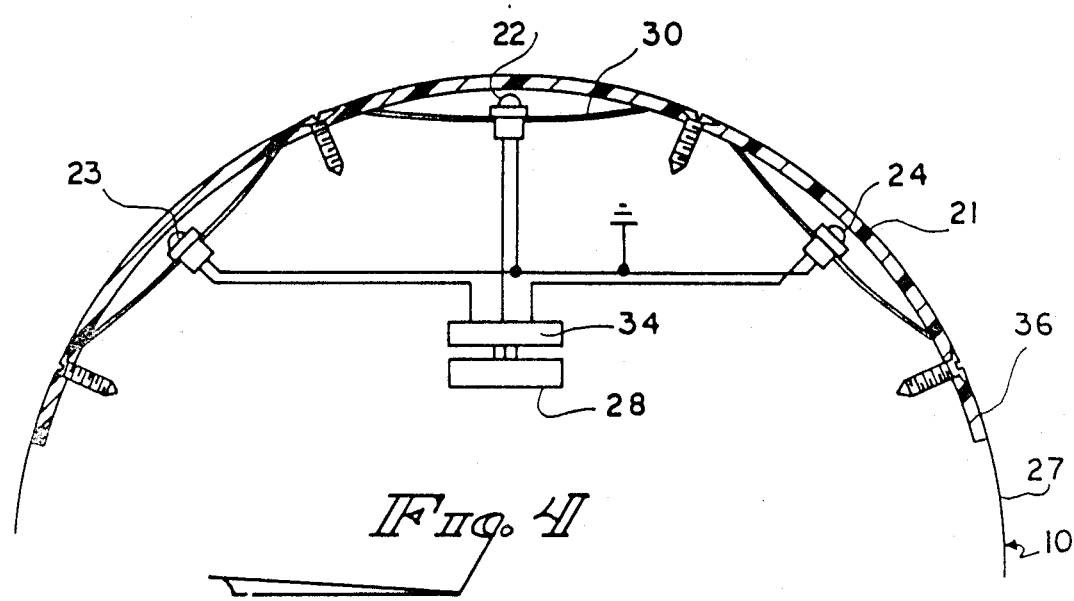

SIGNAL HELMET

BACKGROUND OF INVENTION

As may be seen on any roadway eye level rear signals are more easily discernible to a motorist following another vehicle. It has been statistically determined that the eye level brake signals have a tendency to avoid rear end collision. On a motorcycle the advanatage of such eye level signaling is not easily acquired on the bike itself. The helmet of the cyclist provides a convenient way of raising the signals to the level desired.

SUMMARY OF INVENTION

The invention here describes a smooth surface signal helmet with at least one lens for signal lights flush with the helmet and presenting a singular contour between the lens and the surface of the shell of the helmet. The lights can have sources of radiation comprising a choice of incandescent lamps, halogen lamps, and LEDs. One embodiment envisages a radio receiving module adapted to receive telemetered signal information from the motorcycle proper.

RELATED REFERENCES

Webb U.S. patent Ser. No. Des. 202,539, issued Oct. 19, 1965, shows a helmet with a rear appendage on what appears to be an otherwise smooth contoured shell. Bullard U.S. Pat. No. 2,739,311, issued Mar. 27, 1956, shows a safety helmet with a forward facing light obtrusive to the shell of the helmet.

Scott U.S. Pat. No. 2,473,394, issued June 14, 1949 shows a helmet with inset lenses for a singular lamp and a cable coming out of the helmet to an electrical source. The lens is not perfectly flush with the helmet and the curvature of the outer surfaces of the lens and helmet are not continuous or free of inflection points representing a non streamlined surface readily soiled.

U.S. Pat. No. Des. 255,283, issued June 10, 1980 to Piche shows a helmet with what appears to be a "search" flash light obtrusively extending out of the shell.

Italian Patent No. 639,512 shows a signal helmet with obtrusive lenses on directional and rear lights. The lenses are not flush with the shell of the helmet, are not free of inflection points and the change of contour of the surfaces are not continuous.

BRIEF DESCRIPTION OF THE DRAWING

FIG. 1 represents a perspective view taken from the rear of the helmet showing the location of the lights and the overall contour of the shell and lens.

FIG. 2 represents a side view of the helmet showing in profile the forward portion of the helmet and the side portion.

FIG. 3 is a diagram showing a singular lens for three lights with a cable for connection to the motorcycle proper.

FIG. 4 represents an exploded diagram of the signal helmet's shell. The radiation sources are in cavities in the shell and there is provision for screws to fasten the lens to the shell.

FIG. 5 represents similar to fig.4 an exploded diagram of the lens for fitting flush with the shell and close to and sometimes contiguous to light emitting diodes. There is provision for shielding radiation from one source to the areas of the lens of the adjacent signal light.

FIG. 6 represents a diagram of an electrical alternative to eliminate the cable by using telemetering from the motorcycle.

FIG. 7 is drawn to a readily attached lens with LEDs either with adhesive or with Velcro hook and loop fasteners.

DETAILED DESCRIPTION OF THE PREFERRED EMBODIMENT

Signaling helmet 10 has a shell 19 preferably of molded Fiberglas with a front face portion 11, a back portion 12, and two side portions 13. There is a bottom rim portion 14 of the shell 19 covered with a part of the liner with a cushion 15.

Situated on the back portion 12 and extending toward the side portions 13 are three adjacent signal lights; two directional lights 17 and 18 extending to the two side portions 13 in the extremes, and a tail-and-brake light 16 between the directional lights 17 and 18 in the middle of the back portion 12. The two directional lights 17 and 18 may be yellow in color and the tail-and-brake light 16 may be red in color.

In FIG. 3 is shown the rear portion 12 of the helmet with the two side portions 13 at the horizontal extreme. Illustrated also in FIG. 3 is a cable 25 such as Belden 49442 or 49403 extending from a female jack 28 on the inside of shell connected to the three lights 16, 17, and 18 in the rear portion 12 of the helmet 10 of a desirable length to allow movement of the wearer, without excess length that could tangle and terminating in two easy to disconnected telephone type jacks 20, which may be a male connectors. Of course the motorcycle has corresponding female 28 jack to mate with the male connector 20.

FIGS. 4 and 5 show exploded profiles of the lights 16, 17, and 18 with their components. A single lens 21 of the two colors corresponding to the directional lights and tail-and-brake light extends across the full extent of the lights. In FIG. 4 miniature lamps comprise electrically fed radiation sources 22, 23 which may be halogen or incandescent lamps and which are situated in reflecting cavities in the back portion 12 of the shell 19. Reflective material preferably of sheet aluminum forms a specular surface at 30. Another alternative is to have light emitting diodes 22, 23, and 24 as in FIG. 5 as the radiation source. An example of suitable, commercially available sources are for the halogen lamps are Sylvania miniature lamps type 1992 using type TP20 sockets. For the incandescent lamp there is sold under the Trademark "Dealight" Type 507-3913-1471-600 cartridges in red, green, amber, and white. The LED may be an ultra bright ID 5249-VR of "International Devices Inc."

There is a switch 34 shown in FIG. 3 that makes alternative combination choices of just the tail light operational, or with the brake light operational, or with the whole assembly of lights including the directional lights operational.

As an alternative to having tail-brake-and-directional-energy source and information fed along a cable from the motorcycle to the helmet; in FIG. 6, is shown diagrammatically a radio receiver module 26 and a pair of batteries 29 to power the lights 16, 17 and 18 and radio frequency receiver module 26. The directional and brake information is transmitted radio frequency-wise to communicate from the motorcycle proper to control radiation intensity of the signal light; flashing when appropriate. Three separate frequencies are used for each light and low radio power is used to avoid problems with federal regulations.

As was mentioned the three lights 16, 17, and 18 may use singular lens 21 with an outer surface 36. The lens is inset into the shell so that the outer surface 36 of the lens is flush with the outer surface of the shell. The composite surface thus created by the outer surface 36 of the lens 21 and the outer surface 27 of the shell 19 in close proximity to the lens is free of inflection points and the change of curvature along the composite surface is continuous as is amply illusrated in all of the FIGS. 1-6. Such surface characteristics render a smooth surface to airflow, resistance to being soiled, readily polished and, above all, pleasing to modern aesthetics.

FIG. 7 illustrates an alternative design to the lens 21 with LED sources and reflecting means 42. This lens as shown here may be adhered to a shell of any helmet by a detachable fastening system 32 such as adhesive or a Velcro hook and loop fastener. The hook and loop fastener may be permanently attached to the helmet and lens while the adhesive may be put on the lens so that it can adhere to any unmodified helmet. The cable at 40 may connect to the motorcycle proper for power and tail-brake-directional information as was the non-detachable device above.

There is shown in FIG. 6 a connector at 50 preferably female for the purpose and tieing in the batteries to a source of charging current.

I claim:
1. A sigaling helmet comprising:
   a shell having a bottom rim, two side portions, a back portion, a front portion, an inner surface and an outer surface;
   at least one signal light for radiating outwardly from said shell;
   each said at least one signal light comprising at least one electrically fed radiation source in said at least one cavity in said outer surface and at least one lens having an outer surface covering each said at least one cavity and said at least one radiation source;
   said at least one signal light including two directional signal lights and one tail and brake light between said two directional lights;
   wherein one lens covers said directional lights and said tail and brake light;
   at least one reflecting means situated along at least one of said side portions;
   said lens cover and reflecting means defining a unit covering said back and side portions, said unit being detachably attached by adhesive means to said outer surface of said shell;
   a composite outer surface opposite the lens cover of said unit and the outer surface of said shell in immediate proximity to each other contoured free of inflection points, wherein all change of curvature taken along said composite outer surface is continuous, as is the lens cover;
   means for shielding radiation from each of said directional and said tail and brake light from the adjacent of said lights; and
   a radio and electrical source means adapted to communicate with a radio frequency source coupled to the signal system of a vehicle for controlling radiation intensity of said at least one signal light thereby freeing the signal helmet of external cabling.

2. The helmet of claim 1 wherein each said at least one electrically fed radiation source comprises an incandescent lamp.

3. THe helmet of claim 1 wherein each said at least one electroncially fed radiation source comprses a light emitting diode.

4. The helmet of claim 1 wherein each said at least one electrically fed radiation source comprises a halogen lamp.

5. The helmet of claim 1 wherein said bottom rim is covered with a cushion.

6. The helmet of claim 1 wherein said radio frequency source employs three separate frequencies for each light.

* * * * *

UNITED STATES PATENT AND TRADEMARK OFFICE
CERTIFICATE OF CORRECTION

PATENT NO. : 4,891,736
DATED : JANUARY 2, 1990
INVENTOR(S) : ADAM GOUDA

It is certified that error appears in the above-identified patent and that said Letters Patent is hereby corrected as shown below:

On the face of the patent, the address of the inventor should read:

9548 Fox Hollow Drive
Potomac, Maryland 20854

Signed and Sealed this

Twenty-third Day of April, 1991

Attest:

HARRY F. MANBECK, JR.

*Attesting Officer*

*Commissioner of Patents and Trademarks*